United States Patent

[11] 3,605,055

| [72] | Inventor | James J. Grady |
| | | Somersworth, N.H. |
| [21] | Appl No | 52,021 |
| [22] | Filed | July 2, 1970 |
| [45] | Patented | Sept. 14, 1971 |
| [73] | Assignee | General Electric Company |

[54] TWO-PIECE WINDING BOBBIN FOR WATT-HOUR METER POTENTIAL COIL
16 Claims, 3 Drawing Figs.

[52] U.S. Cl. .................................................. 336/185,
242/118.41, 336/192, 336/208
[51] Int. Cl. ................................................... H01f 27/30
[50] Field of Search .......................................... 336/180,
185, 192, 198, 208; 242/118.41

[56] References Cited
UNITED STATES PATENTS

| 1,960,033 | 5/1934 | Smith ........................... | 336/198 X |
| 2,020,243 | 11/1935 | Hathaway ..................... | 242/118.41 |
| 2,478,207 | 8/1949 | Robinson ..................... | 336/198 X |
| 2,563,393 | 8/1951 | Buys ............................ | 336/198 |
| 3,428,929 | 2/1969 | Brown et al. ................. | 336/192 X |

Primary Examiner—Thomas J. Kozma
Attorneys—Francis X. Doyle, Vale P. Myles, Frank L. Neuhauser, Oscar B. Waddell and Joseph B. Forman ABSTRACT: A winding bobbin for a watt-hour potential coil is formed of two flanged spools that are fitted together to make a unitary bobbin assembly. The two-piece bobbin arrangement is characterized by incorporating an insulated chamber between the adjacent spools when they are in their assembled position, thereby to afford an insulated passageway for connecting the respective electromagnetic coils wound on the two spools in a manner such that the voltage gradient between successive end turns of wire on each coil is reduced to approximately 50 percent of the end-turn gradient that would exist on a single-coil bobbin having an equal number of turns on its supported coil.

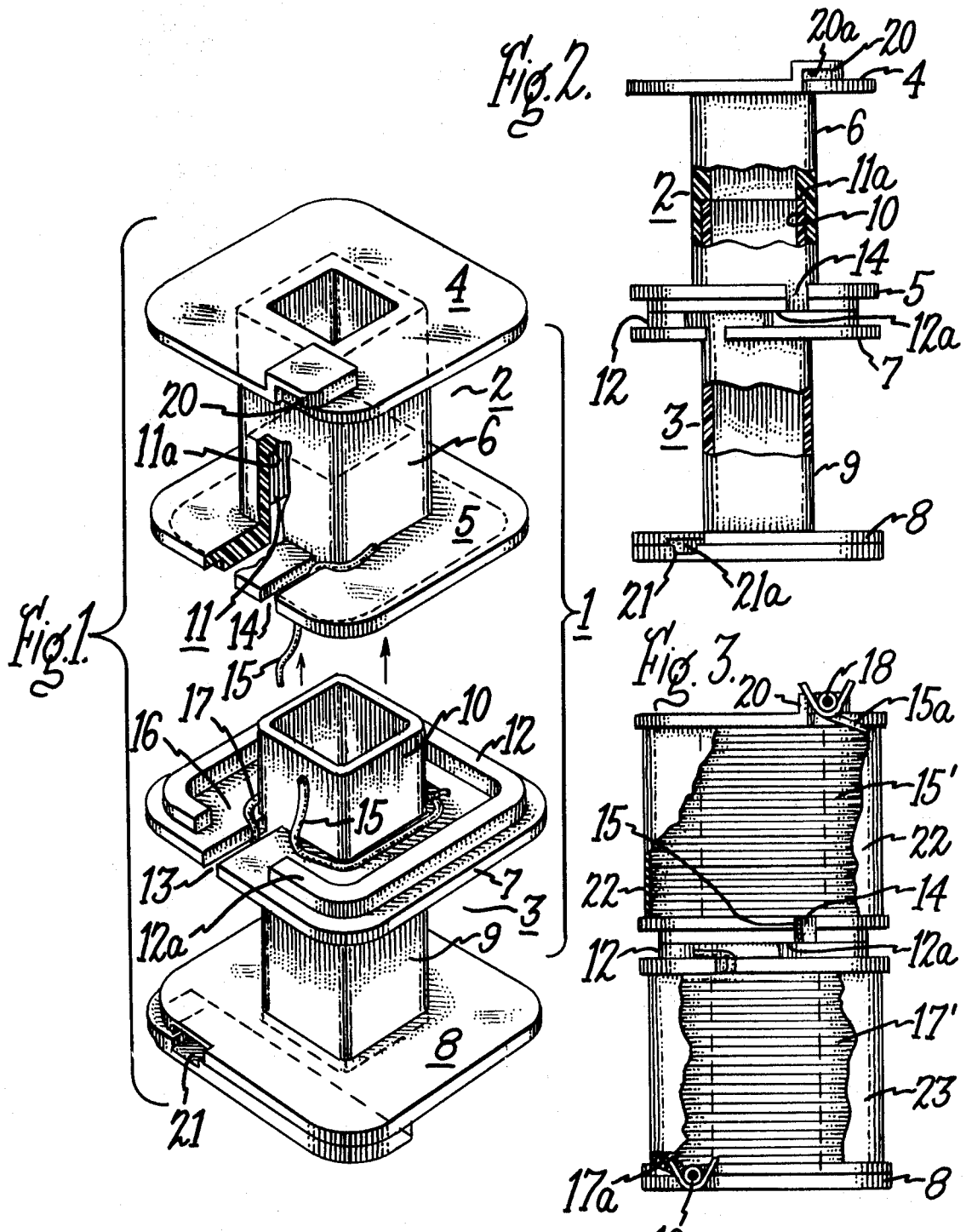

TWO-PIECE WINDING BOBBIN FOR WATT-HOUR METER POTENTIAL COIL

It is common practice in the watt-hour meter filed to subject the potential coil winding of the meter to a high voltage test before the meter is placed in use. Since such tests normally stress the insulation of the potential coil windings much more severely than they are likely to be stressed in normal use of the meter, any weakness in the winding insulation will normally be detected at the time of the testing. Conventionally, these high potential tests are conducted by applying a test voltage directly across the two end terminals of the meter's potential coil; accordingly, the voltage gradient across the coil tends to be uniformly distributed so that each turn of the coil has approximately the same voltage drop across it. In prior art watt-hour potential coil construction, it was common practice to manufacture the coil by simple winding successive layers of turns on a single bobbin progressing from one end to the other end of the bobbin and back again as the turns built up into the final number of turns desired on the coil. Thus, the voltage developed between the end turns on adjacent layers of the potential coil was approximately equal to the number of turns in the two layers of the winding times the average voltage drop across each turn. With such prior art potential coil winding arrangements, the insulation on the end turns of the coil was stressed excessively and thus made subject to breakdown during testing and subsequent thereto when the device was placed in use in the field.

In view of this disadvantage of prior art potential coil construction, it is desirable to provide a meter potential coil winding arrangement that will result in a reduction of the voltage gradient between adjacent end turns of successive layers of a potential coil having a given number of turns on it. It has been recognized that one method of obtaining such a desirable result is to make the potential coil winding in several separate sections which are then electrically connected in series, with the respective coils properly oriented to afford a resultant magnetic flux in a single direction so that the coil will function effectively as a single coil winding when in an assembled position. Of course, in order to make such a multiple-coil winding a practice solution to the major problem of overcoming end turn insulation breakdown, it is necessary to develop a commercially efficient means for forming and assembling it. In addition, it is necessary in manufacturing such a multicoil potential winding to provide a winding assembly that will adequately shield adjacent end turns of the respective coil windings so that the insulation on these turns is not undesirably stressed, and possibly damaged, during high voltage testing of the potential coil.

Accordingly, a primary object of the invention is to provide an improved potential coil mounting arrangement for a watt-hour meter.

Another object of the invention is to provide a transformer winding bobbin having two or more cooperating spools that are interconnected after coils of wire have been wound on each of the spools thereby to form a single, continuous potential coil from the several separate coils on the respective spools.

Yet another object of the invention is to provide a transformer winding bobbin having two interfitting spools that are joined together in a simple, economical to manufacture arrangement that enables separate coils wound on each of the spools to be easily joined together to form a single continuous winding having adequate high potential protection.

Still another object of the invention is to provide a transformer winding bobbin arrangement having two coil winding spools between which an insulated chamber is provided to house the connected ends of the respective coils on the separate spools, thereby to shield these connected ends from the end turns of both of the windings so that a high voltage gradient between these end turns and the connected ends of the coils does not cause damage to the insulation of the windings.

A still further object of the invention is to provide a transformer winding bobbin having two interfitting spools between which a unique, simplified passageway is provided for interconnecting the respective adjacent ends of coils wound on the spools at a point adjacent to the central axes of the spools.

Yet another object of the invention is to provide a multiple-coil transformer winding bobbin that facilitates easy winding on the of the individual coils and at the same time enables the individual coils to be readily coupled together to form a single, continuous winding which develops an electromagnetic flux in a given predetermined direction when the coils are assembled in operating position.

In one preferred embodiment of the invention, a watt-hour meter potential coil is formed on a two-piece winding bobbin in a manner such that the voltage gradient between adjacent end turns on the respective coils is approximately half as great as this gradient would be if the potential coil were wound on a single bobbin in successive layers, pursuant to the practice commonly employed in the prior art. The two-piece bobbin includes a pair of spools formed from insulating material and provided with a pair of flanges that operate to hold the turns of the respective coils in position on the spools. The spools are constructed to slidably engage one another when they are moved into assembled position in end-to-end relationship. In this assembled position, an insulated chamber is formed between the two spools for housing the coupled ends of the respective coils on the individual spools in a manner such that these coupled ends are shielded from the end turns of the coils. Additional objects and advantages off the invention will become apparent from the following detailed description of it, taken in conjunction with the accompanying drawings in which:

FIG. 1 is a perspective view, partly in cross section, of an exploded arrangement of a two-piece transformer winding bobbin shown with respect to fragments of a pair of coils that may be wound respectively on the individual spools of the bobbin, which is constructed pursuant to the teachings of the invention.

FIG. 2 is a side elevation view, partly in cross section, of the transformer winding bobbin in FIG. 1, but depicted in a relatively smaller scale.

FIG. 3 is a side elevation view of the transformer winding bobbin shown in FIGS. 1 and 2 including a pair of complete coils wound respectively on the individual spools of the bobbin and connected to a pair of terminals that are mounted on opposite ends of the bobbin.

Referring now to FIG. 1 of the drawing, there is shown a transformer winding bobbin 1 comprising a first spool 2 and a second spool 3 that are adapted for interfitting connection as will be described in greater detail below. The first spool 2 has a pair of flanges 4 and 5 mounted in fixed relation adjacent opposite ends of a central core portions 6 and extending radially outward therefrom. In like manner, the second spool 3 has a pair of flanges 7 and 8 mounted in fixed relation respectively adjacent opposite ends of a central core portion 9. In the preferred form of the invention, the spools 2 and 3 are formed of a thermal plastic nylon that is easily moldable into the form depicted so that the flanges 4, 5 and 7, 8 are molded integrally with the central core portions 6 and 9, respectively. However, it will be understood that other suitable insulating materials and flange-mounting arrangements may be used without departing from the invention.

In order to retain the spools 2 and 3 in a desired predetermined position with their respective longitudinal axes generally in alignment when the spools are moved together to form a continuous, winding-supporting bobbin, a spool-holding means comprising means forming an abutment 10 on spool 3 and means forming a recess 11 on spool 2 are provided. In the preferred form of the invention, the abutment-forming means 10 is constructed by integrally molding an extension on the central core portion 9 of spool 3, and this extension maintains the same general configuration of the central core portion 9. The abutment 10 also provides the necessary hi-pot creepage distance between an iron core that may be inserted through bobbin 1 and the junction between windings on the bobbin. In a somewhat similar manner, the means defining a recess 11 in spool 2 is a bore in the central portion 6 of the spool 2. As can be seen in FIG. 1, the innermost end of the recess 11 is marked by the ledge 11a which is positioned to retard further inward movement of the abutment 10 into spool 2 when the spools 2 and 3 are mounted in their finally assembled position. It will be appreciated by those skilled in the art that other suitable holding means may be used to prevent relative angular movement between the spool 2 and 3 of the bobbin 1 when they are assembled in operating position; however, the simplified sliding arrangement of the preferred embodiment of the invention has been found toto be very suitable for a number of reasons, including economy of manufacture and maximum hi-pot protection.

A particularly advantageous feature of my invention is the unique coil winding end-shield means that is provided between the juxtaposed flanges 5 and 7, respectively, on the spools 2 and 3 of the bobbin 1. As can be seen in FIG. 1, a wall means in the form of a continuous raised wall member 12 is mounted on the side of the flange 7 that is closest to the flange 5 in the assembled position of the bobbin 1, adjacent the periphery of the flange 7. It will also be noted that a radially extending slot 13 is formed in the flange 7 and a similar radial slot 14 is formed in the flange 5 of spool 2. As will become more clearly apparent from the following description, the slots 13 and 14 may both be formed by any suitable means defining apertures through the respective flanges 5 and 7; however, the radial slot construction shown in the preferred embodiment of the invention is particularly suitable because it affords an optimum shielding arrangement that will be described in detail hereafter.

Pursuant to the present invention, the radial slot 14 is angularly displaced from the radial slot 13 with respect to the longitudinal axes of spools 2 and 3 when the spools are in their assembled position. Accordingly, it will be seen that a top surface portion 12a of a wall member 12 abuts the slot 14 when the spools 2 and 3 are mounted in their assembled position, as shown in FIGS. 2 and 3 of the drawing. Thus, when one end 15 of a coil 15' (see FIG. 3) mounted on spool 2 between the flanges 4 and 5 thereof is inserted through the passageway defined by slot 14 into the chamber 16 defined by wall member 12, it is shielded from the end turns of coil 17' (see FIG. 3) by the flange 7 and wall member 12. In like manner, the end 17 of coil 17' is shielded from the end turns of coil 15' by the flange 5 and wall member 12.

In the preferred embodiment of the invention, the wall member 12 is integrally formed with the flange 7 by being molded from the same body of thermoplastic material. However, it will be apparent to those skilled in the art that other suitable means may be used for forming the insulating wall member 12. Also, although displaced radial slots 13 and 14 are used to define apertures through the respective flanges 7 and 5, it will be apparent that holes could be bored through these apertures adjacent the central core portion of the respective spools 2 and 3 to provide access to the insulated chamber 16 defined by the wall member 12 and flanges 5 and 7. It should be appreciated, however, that the slots 13 and 14 provide ready access to the ends 15 and 17 of coils 15' and 17' so that they could be conveniently coupled together after the coils have been separately wound on the spools 2 and 3.

In order to form a single continuous potential coil winding for a watt-hour meter potential coil persuant to the present invention, it is necessary to wind the respective coils 15' and 17' on their spools 2 and 3 in opposite directions so that when their innermost ends 15 and 17 are coupled together a single, continuous winding is formed by the coils 15' and 17', which will generate a magnetic flux in a single direction through the core portions 6 and 9 of the bobbin 1, when energized. As can be seen in FIG. 3 of the drawing, the two respective other ends 15a and 17a of windings 15' and 17' are electrically and mechanically connected in any suitable manner to a pair of metal contacts 18 and 19 that are mounted respectively in contact-supporting means 20 and 21 (see FIG. 2) on the unapertured flanges 4 and 8 of spools 2 and 3. In this embodiment of the invention, the contact-supporting means 20 and 21 comprise means defining apertures 20a and 21a, which are integrally molded in sections of the unapertured flanges 4 and 8. The metal contacts 18 and 19 are then staked into these apertures 20a and 21a in any suitable manner, such as by thermally deforming the sidewalls of the contact-supporting means 20 and 21 after the contacts are positioned in these apertures. Of course, other suitable contact-supporting means may be used without departing from the scope of the present invention. However, it is important to note that with the transformer winding bobbin arrangement of the present invention the outermost ends 15a and 17a of coils 15' and 17' are positioned adjacent the outer peripheral edges of flanges 4 and 8 respectively, while the current-carrying contact formed between the coils 15' and 17' by the coupling of the ends 15 and 17 is immediately adjacent the central core portions 6 and 9 of the bobbin 1. Accordingly, it will be seen that when a high test voltage is applied to the assembled single, continuous winding illustrated in FIG. 3 of the drawing, between contacts 18 and 19, only half of this voltage will be applied across each of the coils 15' and 17', since they are connected in series. Equally important, the voltage gradient between adjacent layers of the turns of wire on the respective coils 15' and 17' is approximately half of what this voltage gradient would be for a potential coil having the same number of turns as the combined winding 15'–17', if that winding were formed on a single bobbin by simple building up a continuous series of layers of turns of wire on the bobbin. Therefore, the risk of unnecessarily breaking down or damaging the insulation on the wire of coils 15' and 17' at the end turns thereof is appreciably reduced with the present invention.

Those skilled in the art will realize that any suitable insulated wire may be used in practicing the present invention. In the preferred embodiment of the invention illustrated herein, the wire in coils 15' and 17' is a high grade copper that is insulated with a thin layer of varnish. In order to further insulate the coils 15' and 17', layers of insulating tapes 22 and 23 are wound respectively around the coils 15' and 17' in their assembled position. Finally, prior to mounting the potential coil in a watt-hour meter, the bobbin assembly 1 is encapsulated in a moldable insulating resin that permanently bonds the spools 2 and 3 in their desired assembled position.

It should be appreciated that the preferred embodiment of the invention affords a passageway through the hollow central core portions 6 and 9 of the spools 2 and 3 so that a magnetic metal core member may be inserted into this passageway in order to concentrate therein the magnetic field developed by windings 15' and 17'. It will also be seen, particularly by reference to FIG. 1, that the inner surface of this passageway through the core portions 6 and 9 of bobbins 2 and 3 generally rectangular in shape and the walls thereof substantially parallel the outer walls of the core portions 6 and 9. Of course, it desired, other configurations for the core portions and this inner passageway may be used without departing from the scope of the present invention.

Although a particular preferred embodiment of my invention has been illustrated and described herein, it will be apparent to those skilled in the art that various modifications and embodiments of this invention may be utilized without departing from its true and intended scope; therefore, the invention is claimed in detail in the following appended claims.

What I claim and desire to secure by Letters Patent of the United States is:

1. A transformer winding bobbin comprising:
 a. a first spool having an elongated central core portion with a pair of flanges extending radially outward therefrom, said flanges being mounted in fixed relation respectively adjacent opposite ends of said core portion,
 b. a second spool having an elongated central core portion with a pair of flanges extending radially outward therefrom, said flanges being mounted in fixed relation respectively adjacent opposite ends of said core portion, c. spool-holding means holding first and second spool in a predetermined position with their respective longitudinal axes generally in alignment and with one end of the first spool in contact with one end of the second spool, d. means defining an aperture in the flange of said first spool nearest the second spool and means defining an aperture in the flange of said second spool nearest the first spool, said apertures in said flanges affording a passageway through the flanges, e. wall means defining a chamber and contacting each of the apertured flanges of said first and second spools, said chamber being substantially closed except for the access thereto afforded by the passageways through said flanges, whereby a continuous substantially closed passageway is formed from the central core portion of the first spool through the passageway in the apertured flanges and the chamber to the central core portion of the second spool.

2. A transformer winding bobbin as defined in claim 1 wherein said first and second spools are formed of a moldable thermal plastic electrical insulating material, and said flanges are integrally molded with the core portion on which they are mounted.

3. A transformer winding bobbin as defined in claim 1 wherein said spool-holding means comprises means defining a recess in one end of the core portion of the first spool, and means forming an abutment on one end of the core portion of the second spool, said abutment being adapted to extend into said recess inclose, sliding engagement therewith whereby the engagement between said recess and the abutment effectively prevents relative angular movement between said first and second spools, and provides a long tortuous electrical creep path between an uninsulated junction of windings on said spools and a conductive member mounted within the core portion of said spools.

4. A transformer winding bobbin as defined in claim 3 wherein said means defining a recess comprises a plurality of generally flat walls disposed respectively in planes that substantially parallel juxtaposed surfaces of the central portion of said first spool located between the pair of flanges thereon.

5. A transformer winding bobbin as defined in claim 1 wherein said wall means comprises a wall member mounted on the side of one of said apertured flanges that is closest to the other apertured flange.

6. A transformer winding bobbin as defined in claim 5 wherein said wall member is mounted closely adjacent the periphery of at least one of said apertured flanges.

7. A transformer winding bobbin as defined in claim 5 wherein said wall member is integrally formed with the flange on which it is mounted.

8. A transformer winding bobbin as defined in claim 1 wherein each aperture in the respective flanges of both said first and second spools is in the form of a slot extending from the outer edge of the flange in which it is positioned to a point adjacent the base of said flange.

9. An invention as defined in claim 8 in which the longitudinal axes of said slots extend radially outward from the respective central core portions of said spools.

10. An invention as defined in claim 8 wherein the slot in the flange on the first spool is angularly displaced from the slot in the flange on the second spool with respect to the longitudinal axes of said spools.

11. An invention as defined in claim 10 wherein said wall means comprises a wall member mounted on the side on one of said apertured flanges closet to the other apertured flange, said wall member being arranged to form a wall adjacent the periphery of the flange on which it is mounted around substantially its entire periphery except for the area thereof removed by the slot therein, and wherein said angular displacement of the slots in said flanges is sufficient to cause a portion of the top of said wall member to abut the slot in the flange of the other spool.

12. An invention ad defined in claim 1 including a first coil of insulated wire wound on the first spool, and including a second coil of insulated wire wound on said second spool, said first and second coils of wire both having first ends respectively that are positioned in current-carrying contact with each other, whereby said coils form a single continuous winding.

13. An invention as defined in claim 12 wherein said first ends of the coils are both positioned adjacent the central core portion of their respective spools, and said coils are wound so they develop aiding magnetic fields in said core portions when an electric current is passed through the winding.

14. An invention as defined in claim 13 wherein both unapertured flanges respectively are provided with contact-supporting means mounted adjacent the respective peripheral edges thereof, and including a pair of metal contacts mounted respectively on said contact-supporting means, said contacts being electrically connected respectively to the second ends of said coils, thereby to form a complete electrical circuit from one of said contracts, through both of said coils and the junction between them to the other contact.

15. An invention as defined in claim 12 wherein the central core portion of each of said spools is hollow to form a continuous passageway through said core portions when the spools are in said predetermined position, said continuous passageway being adapted to receive therein a magnetic metal core that is effective to concentrate said magnetic fields within the core portions of said spools.

16. An invention as defined in claim 14 wherein the respective second ends of said coils are positioned adjacent the outer peripheral edges of the unapertured flanges when said coils are coupled in operating position.

UNITED STATES PATENT OFFICE
CERTIFICATE OF CORRECTION

Patent No. 3,605,055                    Dated September 14, 1971

Inventor(s) James J. Grady

It is certified that error appears in the above-identified patent and that said Letters Patent are hereby corrected as shown below:

In the ABSTRACT, line 1, after "watt-hour" insert -- meter --

Col. 1, line 5, "filed" should be -- field --

, line 18, "simple" should be -- simply --

, line 43, "practice" should be -- practical --

Col. 2, line 8, delete "on the"

, line 53, "portions" should be --portion --

Col. 3, line 10, "spool" should be -- spools --

, line 13, "toto" should be -- to --

, line 38, "a" should be -- the --

, line 62, "could" should be -- can --

Col. 4, line 29, "simple" should be -- simply --

, line 53, after "3" insert -- is --

, line 55, "it" should be -- if --

Col. 5, line 1, after "holding" and before "first" insert --said--

, line 1, "spool" should read -- spools --.

, line 16, "passageway" should be -- passageways --

(See page 2)

UNITED STATES PATENT OFFICE
CERTIFICATE OF CORRECTION

Patent No. 3,605,055          Dated September 14, 1971

Inventor(s) James J. Grady

It is certified that error appears in the above-identified patent and that said Letters Patent are hereby corrected as shown below:

Page 2 --

Col. 6, line 12, after "side" delete "on" and insert -- of --

, line 41, "claim 12" should be -- claim 13 --

, line 42, after "hollow" insert -- thereby --

Signed and sealed this 21st day of March 1972.

(SEAL)
Attest:

EDWARD M. FLETCHER, JR.
Attesting Officer

ROBERT GOTTSCHALK
Commissioner of Patents